United States Patent
Robey et al.

(10) Patent No.: US 9,825,659 B2
(45) Date of Patent: Nov. 21, 2017

(54) DIGITAL MATCHING OF A RADIO FREQUENCY ANTENNA

(71) Applicant: Massachusetts Institute of Technology, Cambridge, MA (US)

(72) Inventors: Frank C. Robey, Concord, MA (US); Timothy M. Hancock, Somerville, MA (US); Gregory B. Stahl, LaFayette, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/916,376

(22) PCT Filed: Jun. 2, 2015

(86) PCT No.: PCT/US2015/033742
§ 371 (c)(1),
(2) Date: Mar. 3, 2016

(87) PCT Pub. No.: WO2016/028354
PCT Pub. Date: Feb. 25, 2016

(65) Prior Publication Data
US 2016/0218759 A1    Jul. 28, 2016

Related U.S. Application Data

(60) Provisional application No. 62/007,131, filed on Jun. 3, 2014.

(51) Int. Cl.
*H04B 1/10* (2006.01)
*H04B 17/21* (2015.01)
(Continued)

(52) U.S. Cl.
CPC ............ *H04B 1/1027* (2013.01); *H04B 1/18* (2013.01); *H04B 17/21* (2015.01); *H04B 17/336* (2015.01)

(58) Field of Classification Search
CPC .... H04B 1/1027; H04B 17/21; H04B 17/336; H04B 1/18
See application file for complete search history.

(56) References Cited

U.S. PATENT DOCUMENTS

| 1,900,045 A | 3/1933 | Crisson |
| 2,878,325 A | 3/1959 | Merrill |

(Continued)

FOREIGN PATENT DOCUMENTS

WO    WO 2015/013602 A2    1/2015

OTHER PUBLICATIONS

International Preliminary Report on Patentability dated Dec. 15, 2016 for International Application No. PCT/US2015/033742; 9 pages.
(Continued)

*Primary Examiner* — Jaison Joseph
(74) *Attorney, Agent, or Firm* — Daly, Crowley, Mofford & Durkee, LLP

(57) ABSTRACT

A matching technique that may be used with electrically small antennas uses one or more digital circuit blocks connected in a feedback arrangement configured to tune the transfer function response between the antenna and an output port of the system. Each circuit block may include an analog-to-digital converter (ADC), a digital filter, and a digital-to-analog converter (DAC). As such, tuning the transfer function may be achieved by sensing a voltage or current at various circuit nodes using one or more ADCs, filtering the measurements in response-shaping digital filters, and using one or more DACs to drive other circuit nodes in a manner that elicits a desired circuit response. Techniques are provided for allowing a matched antenna to adapt to a changing environment about the antenna. In one (Continued)

illustrative embodiment, the digital circuit blocks may be provided as digital non-Foster circuit blocks.

34 Claims, 11 Drawing Sheets

(51) Int. Cl.
*H04B 17/336* (2015.01)
*H04B 1/18* (2006.01)

(56) References Cited

U.S. PATENT DOCUMENTS

| | | | |
|---|---|---|---|
| 5,613,041 | A | 3/1997 | Keeler et al. |
| RE44,237 | E * | 5/2013 | McHenry .............. H04W 16/14 370/324 |
| 2007/0081611 | A1* | 4/2007 | Fudge .................... G01S 7/021 375/316 |
| 2007/0285326 | A1* | 12/2007 | McKinzie ........... H01Q 9/0407 343/746 |
| 2010/0245012 | A1* | 9/2010 | Chang ................ H01F 17/0006 336/200 |
| 2013/0009720 | A1* | 1/2013 | White ..................... H03H 7/40 333/17.3 |

OTHER PUBLICATIONS

Cauer, et al.; "Life and Work of Wilhelm Cauer;" Proc. MTNS2000, Perpignan, France; Jun. 19-23, 2000; 10 pages.
Chu; "Physical Limitations of OmniDirectional Antennas;" AIP Journal of Applied Physics; vol. 19; 1163; Dec. 1948; pp. 1163-1175; 14 pages.
Chu; "Physical Limitations of OmniDirectional Antennas;" Massachusetts Institute of Technology; Research Laboratory of Electronics; Technical Report No. 64; May 1, 1948; 24 pages.
Fano; "Theoretical Limitations on the Broadband Matching of Arbitrary Impedances;" Technical Report No. 41; Massachusetts Institute of Technology; Research Laboratory of Electronics; Jun. 1947; pp. 57-83; 27 pages.
Foster; "A Reactance Theorem;" The Bell System Technical Journal; vol. 3; Issue 2; Apr. 1924; pp. 259-267; 9 pages.
Harris; "An Investigation of Broadband Miniature Antennas;" United States Naval Postgraduate School; NPS-52MV8091A; Sep. 1968; 37 pages.
Linvill; "Transistor Negative-Impedance Converters;" Proceedings of the I.R.E.; vol. 41; Issue 6; Jun. 1953; pp. 725-729; 5 pages.
Merrill; "Negative Impedance Telephone Repeaters;" vol. 33; Issue 5; Sep. 1954; pp. 1105-1092; 38 pages.
Sievenpiper, et al.; "Experimental Validation of Performance Limits and Design Guidelines for Small Antennas;" IEEE Transactions on Antennas and Propagation; vol. 60; Issue 1; Sep. 15, 2011; 12 pages.
Sievenpiper, et al.; "Materials and Components With a Negative Frequency Derivative of Reactance;" USCD Presentation; Jan. 27, 2012; 22 pages.
Song; "Non-Foster Impedance Matching and Loading Networks for Electrically Small Antennas;" Dissertation—The Ohio State University, Electrical and Computer Engineering; 2011; 164 pages.
Sussman-Fort, et al.; "Non-Foster Impedance Matching for Transmit Applications;" Antenna Technology Small Antennas and Novel Metamaterials; IEEE International Workshop; Mar. 6-8, 2006; pp. 53-56; 4 pages.
Sussman-Fort, et al.; "Non-Foster Impedance Matching of Electrically-Small Antennas;" IEEE Transactions on Antennas and Propagation; vol. 57; No. 8; Aug. 2009; pp. 2230-2241; 12 pages.
Time Magazine; "Electronics: And Now the Mini-Antenna;" May 19, 1967; p. 124; 1 page.
Wheeler; "Fundamental Limitations of Small Antennas;" Proceedings of the I.R.E.; vol. 35; Issue 12; Dec. 1947; pp. 1479-1484; 6 pages.
Wheeler; "Small Antennas;" IEEE Transactions on Antennas and Propagation; vol. AP-23; No. 4; Jul. 1975; pp. 462-469; 8 pages.
PCT Search Report of the ISA for PCT/US15/33742 dated Feb. 3, 2016; 3 pages.
PCT Written Opinion of the ISA for PCT15/33742 dated Feb. 3, 2016; 13 pages.

\* cited by examiner

DIGITAL MATCHING OF A RADIO FREQUENCY ANTENNA

CROSS REFERENCE TO RELATED APPLICATIONS

This application is a U.S. National Stage of PCT application PCT/US2015/033742 filed in the English language on Jun. 2, 2015, and entitled "DIGITAL MATCHING OF A RADIO FREQUENCY ANTENNA," which claims the benefit under 35 U.S.C. §119 of provisional application No. 62/007,131 filed Jun. 3, 2014, which application is hereby incorporated herein by reference in its entirety.

GOVERNMENT RIGHTS

This invention was made with government support under Contract No. FA8721-05-C-0002 awarded by the U.S. Air Force. The government has certain rights in this invention.

FIELD

The subject matter described herein relates generally to radio frequency (RF) antennas and, more particularly, to techniques for matching RF antennas, maximizing signal-to-noise ratio and suppressing interference.

BACKGROUND

In both military and commercial markets, there has been a long felt need for an efficient small antenna that can operate over a wide bandwidth. A principle issue with small antennas is that they have a large electrical reactance relative to radiation resistance. The large reactance creates a mismatch to the load, which can result in a significant power loss. Passive matching can be used to provide an adequate match over relatively small bandwidths. However, there is a fundamental limit to the bandwidth-efficiency product for passive matching. In many applications, it is desirable for a small antenna to operate over bandwidths far exceeding those possible with passive matching.

SUMMARY

The present disclosure relates to methods and systems that are capable of providing active matching for an electrically small antenna to provide operation over a large bandwidth. It should be appreciated that although reference is sometime made herein to digital "non-Foster" matching techniques, the concepts, systems and techniques described herein are not so limited. Reference herein to various embodiments utilizing digital "non-Foster" matching techniques to tune a transfer function response between an antenna and an output node are made to promote clarity in the description of the concepts described. The concepts, systems and techniques described herein apply to a wide range of matching techniques and systems. It is appreciated that non-Foster matching has been used in the past for providing an antenna match. However, past non-Foster matching implementations have displayed severe limitations and, as a result, non-Foster matching has not been widely adopted for use with antennas.

One significant limitation of antenna matching implementations (including non-Foster antenna matching implementations) to date has been the inability of the matching circuitry to adapt when the environment surrounding the antenna changes. This limitation can result in, for example, loss of performance, increased noise, and/or circuit oscillation.

As described in detail herein, a technique referred to as Adaptive Digital Matching of a Radio Frequency Antenna (e.g., Adaptive Digital Matching of non-Foster Antenna or Antenna System) or, more simply, Digital Matching of a Radio Frequency Antenna, allows an antenna match to adapt to a changing antenna environment.

Another limitation of antenna matching (including, but not limited to non-Foster antenna matching) is that a large ratio of electrical reactance to radiation resistance requires that very tight tolerances in the matching must be achieved to provide efficient matching over a wide bandwidth.

The concepts and techniques described herein incorporate digital computation in the determination of the Digital Matching of a Radio Frequency Antenna. This approach provides required tolerances that are not inherent in current analog-only matching approaches.

A further limitation of conventional antenna matching approaches (including non-Foster antenna matching approaches) is that the state of the match is not readily observed.

In accordance with the concepts, systems, circuits and techniques described herein, however, Digital Matching of a Radio Frequency Antenna utilizes one or more techniques that allow the state of an antenna match to be monitored over time.

With knowledge of the changing antenna impedance, modifications may be made to digital processing circuitry (e.g., one or more digital filters, etc.) such that the desired terminating impedance is maintained, even if the antenna environment is changing significantly. In some embodiments, adaptive control may be achieved using digital matching circuitry (e.g. digital non-Foster matching circuitry) that actively drives circuit nodes to determine the optimal load response through the use of a digital-to-analog converter (DAC). This allows for tuning the response from the antenna to the output port with more flexibility than has been achieved in current matching approaches (including, but not limited to current non-Foster matching approaches).

In some embodiments, the ability to adapt to a changing environment may be used to suppress signals received from nearby transmitters that might otherwise interfere with the reception of desired signals in a receiver. This signal suppression capability can be used to support, for example, Simultaneous Transmit and Receive (STAR) operation using nearby transmit antenna.

One goal of a receiver system is to increase (and ideally maximize) the signal-to-noise ratio (SNR) of the received signal so as to enhance the ability of a receiver to accurately detect, demodulate, and/or decode the signal. When passive antenna matching is used, this goal may be achieved by using circuitry that maximizes power transfer from the antenna to the receiver, as maximum power transfer typically translates into maximizing SNR. When active matching is used, efficient power transfer and maximizing SNR are indirectly related. Maximizing the power transfer by providing a precise impedance match is possible, but optimizations other than maximum power transfer are possible with the new approach. Noise currents and voltages of the receiving circuitry may be incorporated into the maximization. In this regard, in some embodiments described herein, matching techniques are provided that allow independent optimization for power transfer or for maximizing SNR (e.g., using multi-loop matching, etc.) by minimizing the response to these noise currents and voltages, or, the desired signal SNR can be maximized by suppressing other interference sources.

In accordance with one aspect of the concepts, systems, circuits, and techniques described herein, an antenna system comprises: an antenna; receiver circuitry to process signals received by the antenna, the receiver circuitry including a first electronic component having an input coupled to a port of the antenna; and matching circuitry to tune the transfer function response between the antenna and the first electronic component, the matching circuitry including a digital circuit block to implement matching, the digital circuit block being coupled to provide feedback to the port of the antenna, wherein the digital circuit block includes: an analog-to-digital converter (ADC) to convert a sensed analog input signal to a digital output signal; a digital processor to process the digital output signal of the ADC in accordance with a transfer function associated with a matching scheme; and a digital-to-analog converter (DAC) to convert a digital output signal of the digital processor to an analog signal.

In one illustrative embodiment, the matching circuitry includes a digital non-Foster circuit block to implement non-Foster matching, the digital non-Foster circuit block being coupled to provide feedback to the port of the antenna, wherein the digital non-Foster circuit block includes: an analog-to-digital converter (ADC) to convert a sensed analog input signal to a digital output signal; a digital processor to process the digital output signal of the ADC in accordance with a transfer function associated with a non-Foster matching scheme; and a digital-to-analog converter (DAC) to convert a digital output signal of the digital processor to an analog signal.

In one embodiment, the ADC of the digital circuit block samples a signal on a node of the receiver circuitry after the first electronic component; and the DAC of the digital circuit block injects an analog signal at the input of the first electronic component.

In one embodiment, the matching circuitry includes multiple digital circuit blocks, wherein each of the multiple digital circuit blocks samples different nodes in the receiver circuitry, implements a different transfer function within a corresponding digital processor and provides feedback to the antenna port by a different mechanism.

In one embodiment, the matching circuitry includes at least two digital circuit blocks that are cross coupled with one another in a manner that combines different sensing modes with different feedback mechanisms.

In one embodiment, the antenna is an electrically small antenna.

In one embodiment, the matching circuitry is configured to adapt to a changing environment around the antenna to maintain a desired transfer function response between the antenna and the first electronic component.

In one embodiment, the matching circuitry further comprises: a waveform source for imparting a probe waveform to a node associated with the first electronic component and the antenna; and a monitor for monitoring a response of the first electronic component and/or the antenna to the probe waveform.

In one embodiment, the matching circuitry further comprises: a system model generator to determine a system model based on the response of the first electronic component and/or the antenna to the probe waveform; and a filter modification unit to modify the transfer function associated with the digital circuit block based, at least in part, on the system model. Such extraction of signal models falls under the general field of System Identification (see, e.g., T. Söderström, P. Stoica, *System Identification*, Prentice Hall, 1989.)

In one embodiment, the transfer function is used to maximize signal to noise ratio at an antenna system output port.

In one embodiment, the transfer function is used to minimize signal distortion at an antenna system output port by correcting for non-linear responses.

In one embodiment, the antenna system further comprises means to activate and deactivate the probe waveform source.

In one embodiment, the waveform source is configured to generate a probe waveform having a relatively high signal level and a short duration.

In one embodiment, the matching circuitry further comprises: a system model generator to generate a system model based on the response of the antenna and/or first electronic component to the applied probe waveform; a digital filter to compensate the applied probe waveform; and a difference unit to subtract the probe waveform from an output signal of the first electronic component.

In one embodiment, the waveform source is configured to generate a probe waveform having a relatively low signal level that is continuously applied to the node during antenna operation.

In one embodiment, the ADC and the DAC are configured to operate in a sub-sampling mode and the matching circuitry is configured to perform matching operations in Nyquist zones greater than a first Nyquist zone.

In accordance with another aspect of the concepts, systems, circuits, and techniques described herein, a method for tuning the response between an antenna and an electronic component comprises: sampling and digitizing a signal at a circuit node in an antenna system having an antenna coupled to a first electronic component; filtering the digitized signal in a digital filter to generate a filtered digital signal; converting the filtered digital signal to an analog signal and feeding the analog signal back to a node associated with the antenna, wherein the digital filter includes a transfer function that is designed to provide matching between the antenna and the first electronic component; superimposing a probe waveform onto the digital signal before the filtered digital signal is converted to analog signal that is fed back to the node associated with the antenna; monitoring a response of the antenna and/or the first electronic component to the probe waveform; and modifying the transfer function of the digital filter based on the response of the antenna and/or the first electronic component to the probe waveform to maintain a matched condition between the antenna and the first electronic component when an environment about the antenna is changing.

In one embodiment, the method further comprises continually repeating superimposing, monitoring, and modifying filter responses during operation of the antenna system.

In one embodiment, the transfer function of the digital filter is computed in accordance with one of the following goals: optimizing power transfer, optimizing SNR, suppressing undesired receive signals, and suppressing undesired non-linear circuit responses.

In one embodiment, the digital filter includes a first digital filter and the filtered digital signal includes a first filtered digital signal; and the method further comprises: filtering the digitized signal in a second digital filter to generate a second filtered digital signal; and converting the second filtered digital signal to a second analog signal and feeding the second analog signal back to a node associated with the antenna, wherein the second digital filter includes a second transfer function that is designed to provide non-Foster matching between the antenna and the first electronic component.

In one embodiment, the circuit node in the antenna system includes a first circuit node; and the method further comprises: sampling and digitizing a second signal at a second circuit node in the antenna system to generate a second digitized signal; filtering the second digitized signal in a second digital filter to generate a second filtered digital signal; and converting the second filtered digital signal to a second analog signal and feeding the second analog signal back to the same or a different node associated with the antenna, wherein the second digital filter includes a second transfer function that is designed to provide non-Foster transfer function tuning between the antenna and the first electronic component.

In accordance with a further aspect of the concepts, systems, circuits, and techniques described herein, an antenna system, comprises: a multiport antenna; receiver circuitry to process signals received by the multiport antenna, the receiver circuitry including a first electronic component having an input coupled to one or more ports of the antenna; and matching circuitry to provide a desired transfer function response between the multiport antenna and the first electronic component, the matching circuitry including a digital circuit block to implement matching, the digital circuit block being coupled to provide feedback to at least one port of the multiport antenna so that the antenna forms a portion of the feedback loop, wherein the digital circuit block includes: an analog-to-digital converter (ADC) to convert a sensed analog input signal to a digital output signal; a digital processor to process the digital output signal of the ADC in accordance with a transfer function associated with a matching scheme; and a digital-to-analog converter (DAC) to convert a digital output signal of the digital processor to an analog signal.

In one illustrative embodiment, the digital circuit block to implement matching may be provided as a digital Non-Foster circuit block to implement Non-Foster matching. The digital Non-Foster circuit block is coupled to provide feedback to at least one port of the multiport antenna so that the antenna forms a portion of the feedback loop. In one illustrative embodiment, the digital Non-Foster circuit block includes: an analog-to-digital converter (ADC) to convert a sensed analog input signal to a digital output signal; a digital processor to process the digital output signal of the ADC in accordance with a transfer function associated with a non-Foster matching scheme; and a digital-to-analog converter (DAC) to convert a digital output signal of the digital processor to an analog signal.

In one embodiment, the matching circuitry includes one DAC for each of at least two ports of the antenna for use in providing feedback.

In one embodiment, the multiport antenna includes multiple coils wrapped about a common magnetic core, wherein each coil defines a port of the antenna and the magnetic core forms a feedback summing junction wherein the multiple coils are configured to achieve a desired flux combining ratio.

In one embodiment, the multiport antenna includes distributed capacitive coupling structures to serve as a feedback summing junction, wherein one or more feedback signals are coupled through an electric field within the distributed capacitive coupling.

BRIEF DESCRIPTION OF THE DRAWINGS

The foregoing features may be more fully understood from the following description of the drawings in which.

DETAILED DESCRIPTION

Figure 1A:
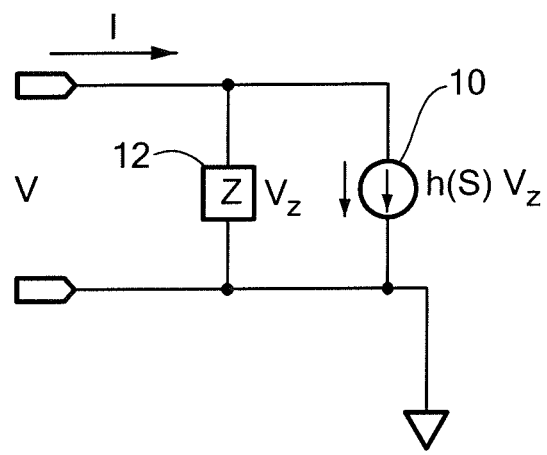
FIGS. 1A and 1B are circuit schematics illustrating two exemplary single-port matching configurations that may be used to facilitate digital implementation in accordance with various embodiments.

The present disclosure relates to active matching techniques and systems that may be used to match electrically small antennas. The term "electrically small antenna" is normally used to describe an antenna that is physically small with respect to a corresponding frequency of operation. One definition that has been used in the past is that an electrically small antenna is an antenna having a maximum dimension that is less than $\lambda/2\pi$, where $\lambda$ is the free-space wavelength at a frequency of operation. As will be described in greater detail, active matching techniques are provided herein that allow electrically small antennas to be matched over a bandwidth much broader than passive matching and overcomes limitations of current active matching techniques. Techniques and systems are also described that allow an antenna match to adapt to a changing antenna environment.

The circuits, techniques, systems, and concepts described herein may be used to match both single-port and multi-port antennas. Some example of single port antennas include simple or loaded dipoles, monopoles and simple or ferrite-loaded loops. Some examples of multi-port antennas include tapped dipoles, monopoles with a driven sleeve or base ring, loop antennas with multiple coils, and loop antennas with multiple tap points on the loops. The disclosed techniques may also be used with multi-element antennas consisting of both loops and dipoles or monopoles where the elements are configured to form a vector antenna.

It has been shown that the reactance of passive networks always increases monotonically with frequency (see. e.g., Foster, R. M., "A Reactance Theorem," *Bell System Technical Journal*, vol. 3, no. 2, pp. 259-267, November 1924). Because Ronald Foster first proposed this theorem, matching techniques that use circuitry for which the impedance (reactance) does not increase with increasing frequency have come to be known as non-Foster matching.

While many of the techniques, systems, and features described herein are non-Foster in the sense that the active circuitry connected to the antenna port does not have an input impedance that increases with frequency, the broad concepts described herein are not so limited.

In the past, non-Foster matching was predominantly practiced using analog circuitry. Such circuits were typically referred to as Negative Impedance Converters (NICs) or Negative Impedance Inverters (NIIs), depending on circuit topology. In at least some of the illustrative systems and techniques described herein, non-Foster matching is implemented using a mix of digital and analog processing.

In addition, unlike systems of the past, systems and techniques of the present disclosure also incorporate elements of control systems theory, system identification, and adaptive processing techniques in various embodiments. As will be described in greater detail, the Adaptive Digital Matching concepts, techniques and systems described herein, as may be applied to a radio frequency antenna (e.g., a non-Foster antenna) or antenna system, for example, provide added flexibility to a matching network that can be leveraged to allow enhanced functionality and matching accuracy. [0060] In various embodiments, the active matching techniques and systems of the present disclosure may involve one or more of the following concepts: 1. actively driving circuit nodes with a digital-to-analog converter to elicit a desired circuit response, (even if such response violates Foster's reactance theorem for passive circuitry); 2. sensing a voltage or current at various circuit nodes, filtering these measurements in response-shaping digital filters, and using these as the source for driving the circuit nodes; 3. sensing antenna and circuit impedances along with match quality through the application of a probe waveform or waveforms; and 4. adapting or modifying digital filters to optimize an antenna match in real time. The active matching techniques may be used to match electrically small antennas as well as other antennas. In some implementations, matching may be implemented where a multiplicity of circuit nodes are created by the series or parallel combination of passive components including, for example, resistors, capacitors, inductors, and/or transformers.

Digital circuit blocks may be used that each include a cascade of an analog-to-digital converter (ADC), a digital filter including digital summing circuitry, and a digital-to-analog converter (DAC). The digital circuit blocks may be applied to selected circuit nodes in the system. Cross-connection of digital circuit blocks may also be used where the signal from one block's ADC is passed through a second digital filter and applied to a summing block of another circuit block. In some embodiments, a digital output is created for further processing by digitally filtering and summing the ADC signals from one or more digital circuit blocks.

Figure 1B:
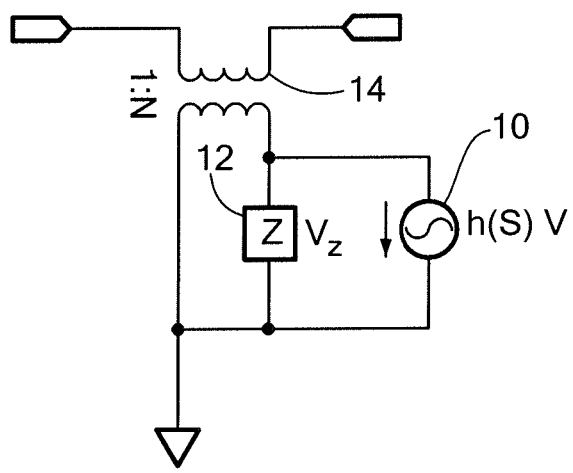

FIGS. 1A and 1B are circuit schematics illustrating two exemplary single-port non-Foster matching configurations that may be used to facilitate explaining digital implementation in accordance with various embodiments. In the matching configuration of FIG. 1A, a voltage-controlled current source 10 is connected in parallel with an impedance (Z) 12. The controlled current source has a transfer function h(s) that generates a current value of $h(s)V_Z$, where $V_Z$ is the voltage across the impedance Z. The current/voltage relationship at the input of the matching configuration may be expressed as follows:

$$V = I\left(\frac{Z}{1 + h(s)Z}\right)$$

Given this equation, it is noted that h(s) determines the impedance observed; when $h(s)=-2/Z$, the current/voltage relationship will be $V=-ZI$. Thus, the impedance looking into the input of the matching configuration is a negative impedance $-Z$, which is typical for non-Foster circuitry. For digital matching, a digital filter is used to provide the desired response for h(s).

In the configuration of FIG. 1, a voltage-controlled current source is used. A voltage-controlled current source is a typical approach to producing a digital-to-analog converter (DAC). It should be appreciated, however, that a voltage-controlled voltage source may alternatively be used in which case the impedance Z would appear in series with the voltage-controlled voltage source rather than in parallel with the voltage-controlled current source. As will be described in greater detail, in various embodiments, digital matching (including, but not limited to digital non-Foster matching) may be implemented using digital blocks that include a digital-to-analog converter (DAC) at an output thereof. As such, a voltage-controlled current source may be preferable as it is more consistent with the typical implementation of a DAC.

In the matching configuration of FIG. 1B, a voltage-controlled current source 10 is again connected in parallel with an impedance (Z) 12. However, this configuration also includes an input transformer 14. The current/voltage relationship at the input of this configuration is substantially the same as that described above, except that it is scaled by the transformer turns ratio N as follows:

$$V = \frac{1}{N^2}\left(\frac{Z}{1 + h(s)Z}\right).$$

Since DAC outputs are usually ground-referenced, the incorporation of a transformer provides a matching component that is floating with respect to ground and can thus be connected in series with other building blocks in a matching circuit.

Figure 2A:
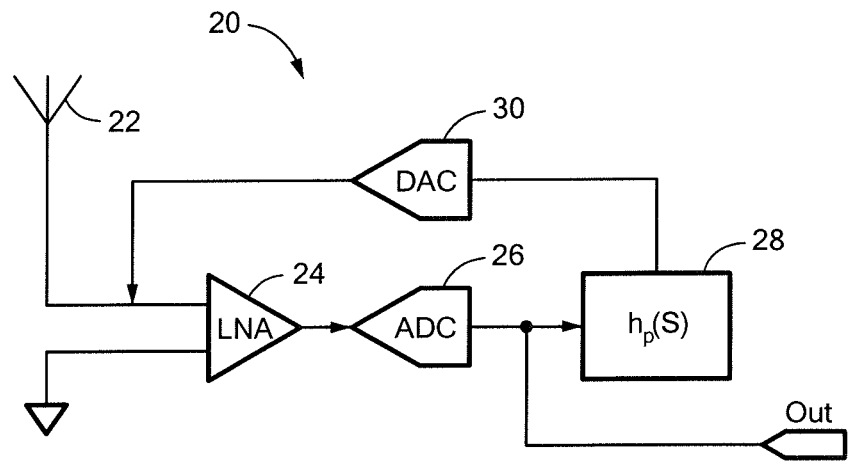
FIG. 2A is a block diagram illustrating an exemplary single loop antenna system having a digital circuit that is foamed through shunt feedback in accordance with an embodiment.

In the description that follows, the matching of an antenna system is modeled to provide a better understanding of the power transfer from the antenna and the impact of typical high frequency (HF) electronics noise sources on matching performance. FIG. 2A is a block diagram illustrating an exemplary single loop antenna system 20 having a digital non-Foster circuit that is formed through shunt feedback. As shown, the antenna system 20 includes: an antenna 22, a low noise amplifier (LNA) 24, an analog-to-digital converter (ADC) 26, a digital filter 28, and a DAC 30. The antenna 22 may include, for example, an electrically small antenna. The LNA 24 represents the first electronic component of a receiver system. The antenna 22 is to be matched to this first component. The ADC 26, the digital filter 28, and the DAC 30 together form a "digital non-Foster block." As will be described in greater detail, these digital non-Foster blocks may operate as building blocks in various adaptive and non-adaptive digital matching schemes, e.g., as may be applied to a radio frequency antenna (e.g., a non-Foster antenna) or antenna system. In this embodiment, the ADC 26, the digital filter 28, and the DAC 30 form a feedback loop from an output of the LNA 24 to an input thereof. In this manner, the DAC 30 is able to actively drive the LNA input node/antenna node in a manner designed to elicit a desired circuit response. The digital filter 28 may be configured to have a filter response (or transfer function) $h_p(s)$ that is designed to achieve the desired circuit response. As shown, the output of the ADC 26 may be used as the output of the antenna/LNA pair in, for example, systems that include digital receivers. It should be appreciated, however, that the analog output of the LNA 24 may alternatively be used. As described above, the LNA 24 represents the first component of a receiver system in the illustrated embodiment. It should be appreciated, however, that other types of components may serve as the first component in other embodiments.

The digital filter 28 can be implemented using any type of digital processor capable of supporting a requisite processing speed including, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, discrete digital circuitry, and/or others, including combinations of the above. Any type of digital filter may be used including, for example, a finite impulse response (FIR) filter, an infinite impulse response (IIR) filter, etc. although current implementations favor IIR filters for their lower group delay relative to FIR filters. Techniques for designing and configuring digital filters having desired responses are well known in the art.

Figure 2B:
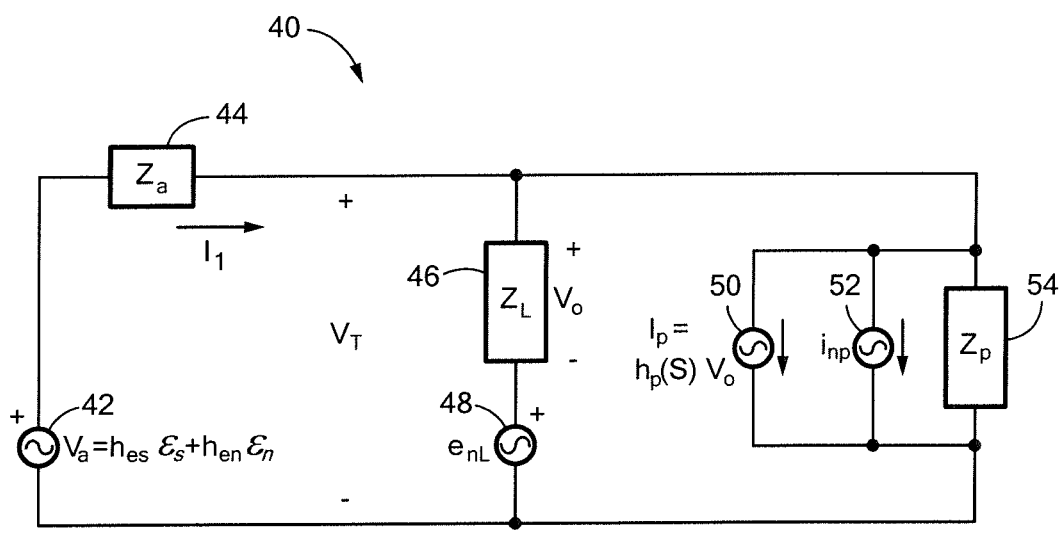
FIG. 2B is a schematic diagram illustrating an exemplary electrical model of the antenna system of FIG. 2A.

FIG. 2B is a schematic diagram illustrating an electrical model 40 of the antenna system 20 of FIG. 2A. A voltage source 42 represents an open circuit voltage ($V_a$) of the antenna 22. An impedance 44 represents an antenna reactance $Z_a$. The antenna reactance $Z_a$ is assumed to consist of a series combination of the antenna radiation resistance ($R_r$), the loss resistance ($R_l$), and the antenna reactance ($X_a$). It is noted that this form of antenna model is suitable for short dipoles and loops without a ferrite core. Ferrite core loops will typically require a more complex antenna model that incorporates core magnetizing losses and inductance. The antenna open circuit voltage ($V_a$) may be obtained by multiplying the effective antenna height by the electric field strength. Voltage terms are shown corresponding to a signal electric field strength $\epsilon_s$ with antenna effective height $h_{es}$ and a noise signal field strength $\epsilon_n$ with antenna effective height $h_{en}$. As is well known, effective antenna heights, antenna radiation resistance, and antenna loss resistance are typically specific to different antenna configurations.

The impedance 46 in the model 40 of FIG. 2B represents a load resistance $Z_L$. The load resistance $Z_L$ primarily includes the input impedance of the LNA 24 (or another first component of the receive chain). A voltage source 48 in the model 40 represents the input noise voltage of the LNA 24 which is typically depicted in series with the amplifier input. A current source 50 represents the controlled current source ($I_p$) of the digital block (which in some illustrative embodiments may be provided as a digital non-Foster block). A current source 52 represents two noise current sources that are combined into a single source labeled ($i_{np}$). The two sources are the current noise of the input amplifier (LNA) and the current noise of the controlled current source 50. An impedance 54 represents an output impedance ($Z_p$) of the controlled current source. The model 40 assumes that the gain of the LNA is high enough to ignore noise sources that occur after the LNA 24 in the receiver.

In the model 40 of FIG. 2B, the output voltage ($V_O$) of the system is across the load impedance $Z_L$ 46. The output voltage of the antenna is labeled $V_T$. The output voltage ($V_O$) can be derived by first writing a loop equation for the loop having current $I_1$ as follows:

$$V_A = Z_a I_1 + V_T$$

Next, the summation of currents for the $V_T$ node is written:

$$I_1 = \frac{V_o}{Z_L} + \frac{V_T}{Z_p} + I_p + i_{np},$$

The current of the controller current source 50 is $I_p = h_p(s)V_o$. The antenna output voltage is $V_T = V_O + e_{nL}$. For purposes of convenience, in the description that follows the reliance of functions on the parameter S will not be shown unless needed. Solving the above equations for $V_O$ results in:

$$V_o = \frac{V_A}{1 + h_p Z_a + \frac{Z_a(Z_p + Z_L)}{Z_p Z_L}} - \frac{i_{np}Z_a + e_{nL}\left(1 + \frac{Z_a}{Z_p}\right)}{1 + h_p Z_a + \frac{Z_a(Z_p + Z_L)}{Z_p Z_L}}$$

This equation can be split into signal and noise terms by noting that $V_a = h_{es}\epsilon_s + h_{en}\epsilon_n E$. The resulting equation is:

$$V_o = \frac{h_{es}E_s}{1 + h_p Z_a + \frac{Z_a(Z_p + Z_L)}{Z_p Z_L}} - \frac{i_{np}Z_a + e_{nL}\left(1 + \frac{Z_a}{Z_p}\right) - h_{en}E_n}{1 + h_p Z_a + \frac{Z_a(Z_p + Z_L)}{Z_p Z_L}}$$

The terms on the right side of this equation correspond to the signal and noise, respectively. Ignoring noise, it is noted that the maximum signal power transfer from the antenna to the circuit occurs when $V_T = V_A/2 = h_{es}\epsilon_s/2$. This occurs when:

$$V_T = \frac{V_A}{2} = \frac{h_{es}E_s}{2}, \text{ or}$$

$$h_p = \frac{(Z_a Z_L - Z_a Z_p - Z_a Z_L)}{Z_a Z_p Z_L}$$

The signal-to-noise ratio (SNR) can now be calculated as the ratio of the square of the signal voltage to the sum of the squares of the voltages due to each of the noise sources. This results in:

$$SNR_L = \frac{|h_{es}|^2 |E_s|^2}{\left(|Z_a|^2 |i_{np}|^2 + \left|\frac{(Z_a + Z_p)}{Z_p}\right|^2 |e_{nL}|^2 + |h_{en}|^2 |E_n|^2\right)}$$

The antenna system 20 of FIG. 2A was simulated in Matlab for a 30 cm total length top-hat loaded dipole with an ADC, digital filter, and DAC clocked at 250 MHz. To determine the digital filter response, the analog transfer function was calculated per the previous expression for maximum power transfer and a bilinear transformation was applied. The resulting closed loop matching was found to have barely sufficient phase margin as the frequency approached half the sampling frequency. An additional pole at 120 MHz was introduced to roll off the response of the digital filter at higher frequencies and ensure stability. The digital filter that resulted may be expressed as follows:

$$H(z) = 0.019445 \frac{(z+0.4115)(z+1)^3}{(z+1)^2(z^2+0.7688z+0.9759)}$$

There are many approaches to converting analog filter responses to digital filters (e.g., Discrete-Time Signal Processing, A. Oppenheim, R. Schafer, Prentice Hall, 1989), the bilinear transformation being just one of them. Alternatively, the transfer function response can be accomplished in the sampled data domain using direct synthesis of the digital filters and a digital model of the system created using the probe waveform. Such digital design is common in digital control.

Figure 3:
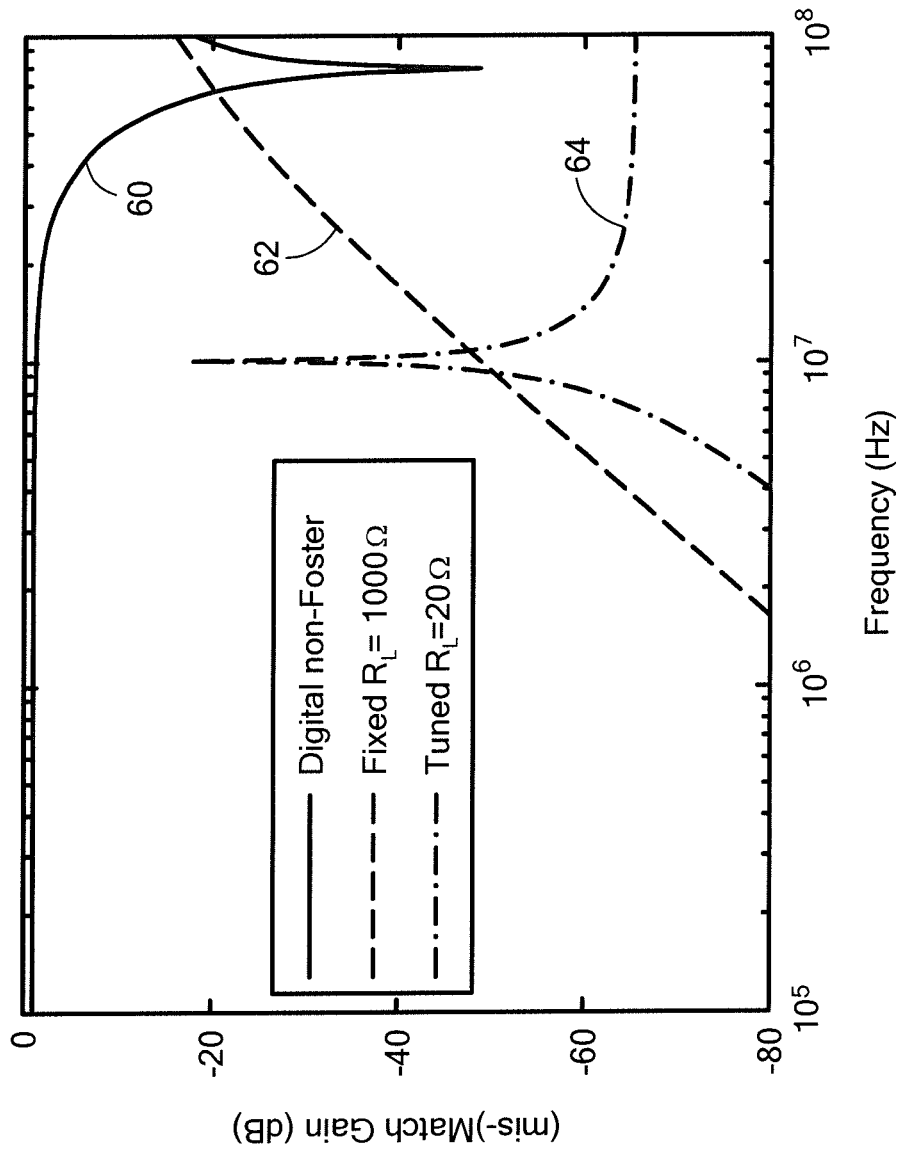
FIG. 3 is a plot illustrating simulated match gain versus frequency for various load scenarios for the antenna system of FIG. 2A.

FIG. 3 is a plot illustrating simulated match gain versus frequency for various load scenarios. The match gain is the gain between free-space reception of the antenna and the load. The plot includes three curves. Curve 60 corresponds to a digital load (e.g. a digital non-Foster based load). Curve 62 corresponds to a relatively high, fixed load resistance of 1000 ohms. Curve 64 corresponds to a load resistance of 20 Ohms that is resonated with a series inductor at 10 MHz. The above-derived digital filter assumed the radiation resistance was constant with frequency, but the simulation calculated the radiation resistance with frequency. This induced a small loss relative to ideal, but with radiation resistances being much less than an ohm, it is likely realistic.

The digital filter has a multiplicity of poles and zeros that are within five significant digits of −1 (i.e. the (z+1) terms in the above equation). In actual practice, this transfer function would be simplified. However, for purposes of this analysis, the filter response was not simplified other than to ensure that the filter was stable.

Because the dipole is short, the radiation resistance is very low across the frequency band of interest and the peak of the resonated response 64 does not approach zero. The mismatch between the antenna radiation resistance and the tuned load could have been improved at resonance. However, based on Fano's network theorem, the bandwidth could not have been significantly improved.

It is noted that the SNR at the load for this circuit topology does not depend on the filter response $h_p$. Thus, the power transfer from the antenna can be maximized, but with no impact on the resulting SNR. This is because the circuit topology chosen is reducible by a series of Norton and Thevenin transforms to a single loop and maximizing signal power in the single loop also maximizes noise power. Alternative circuit topologies exist where the output SNR is a function of the filter response. Some of these topologies are described below.

While the topology of FIG. 2A does not overcome the noise figure impact of the antenna source impedance and load voltage divider, there are still potential benefits of this topology. One benefit is that the circuit equalizes the signal voltage across frequency. This can reduce the dynamic range required in the ADC. A second benefit relates to application in a simultaneous transmit and receive (STAR) based system. One such STAR application is described below.

Figure 4:
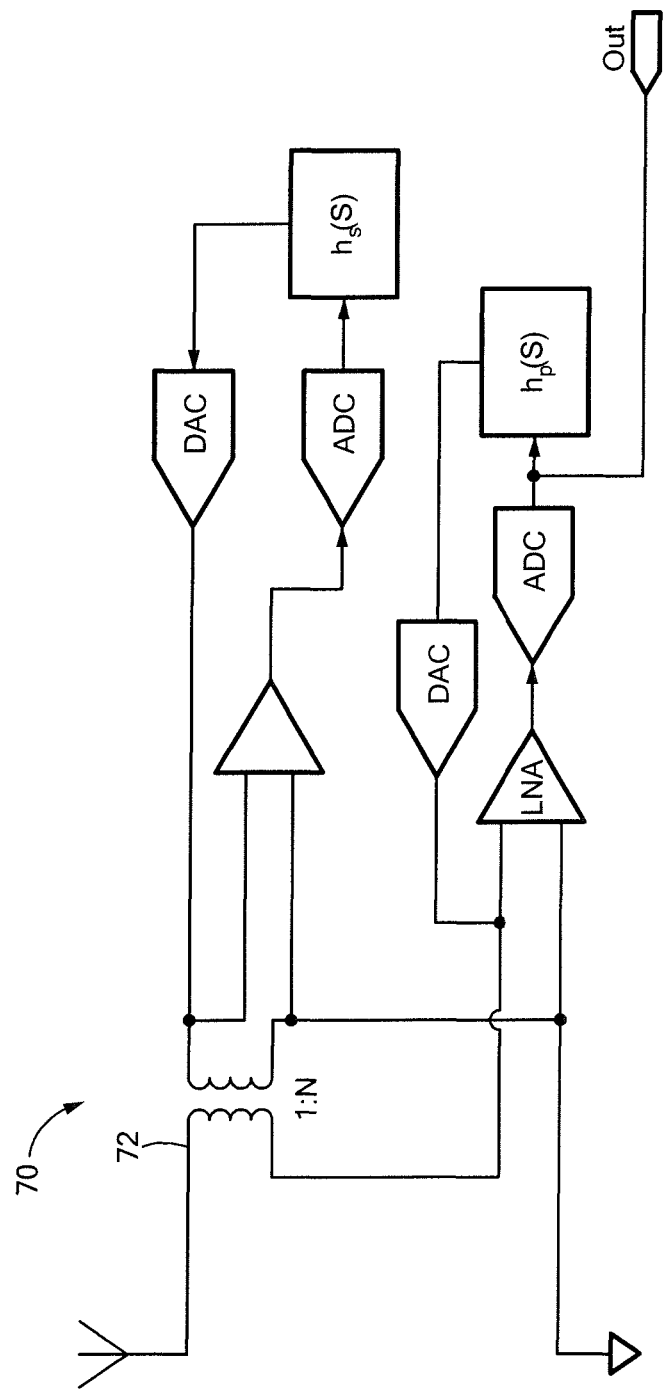
FIG. 4 is a block diagram illustrating an exemplary series-parallel antenna system architecture in accordance with an embodiment.
Figure 5:
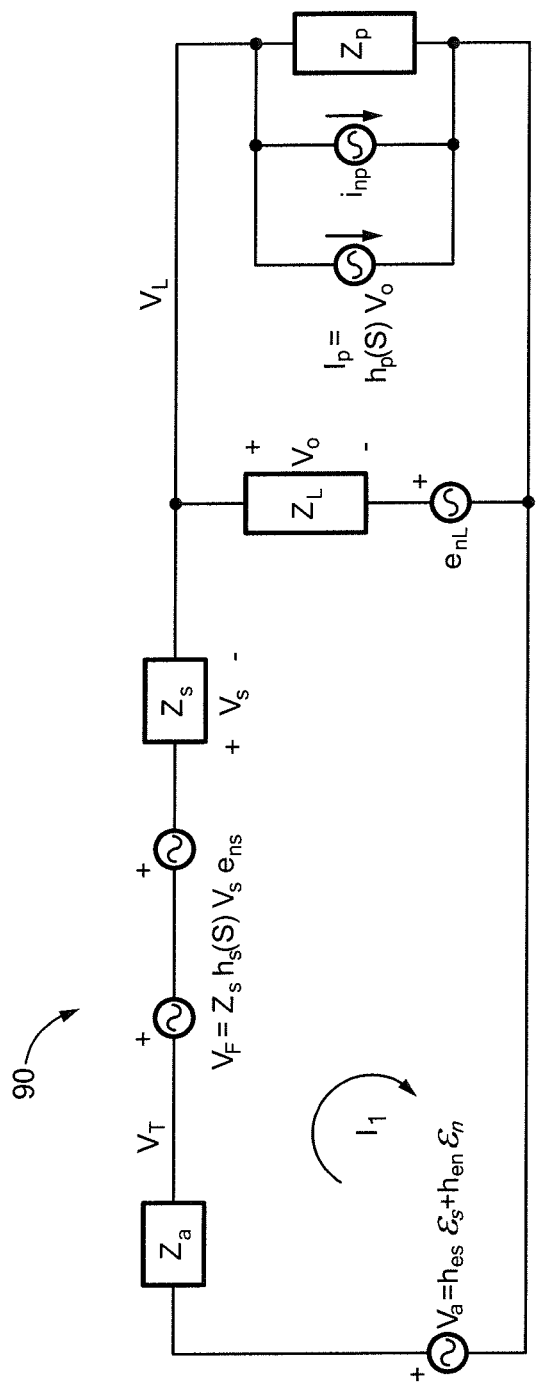
FIG. 5 is a schematic diagram illustrating an equivalent model of the antenna system of FIG. 4.

FIG. 4 is a block diagram illustrating an exemplary series-parallel antenna system architecture 70 in accordance with an embodiment. FIG. 5 is a schematic diagram illustrating an equivalent model 90 of the antenna system 70 of FIG. 4. This architecture was chosen because it implements a non-Foster matching topology that is commonly published. The system includes an ideal transformer 72 that provides a series non-Foster element as well as shunt feedback that provides a parallel non-Foster reactance to the load. $Z_s$ is the series feedback resistance which would ideally, but not practically, be equal to zero after reflection from the secondary to the primary of the ideal transformer. $V_s$ is the Thevenin equivalent of the series current source after passing through the ideal transformer. In the simplified block diagram of FIG. 5, the transformer turns ratio is not written explicitly since it can be subsumed into scaling of $Z_s$, $h_s(S)$, and $e_{ns}$. It should be appreciated that the parallel filter $h_p(S)$ and the series filter $h_s(S)$ may be replaced with their Z-transform equivalents.

In the model 90 of FIG. 5, a simplified noise model is used. That is, only an input noise voltage $e_{ns}$ is shown for the series component and the $i_n$ term of the typical $v_n$-$i_n$ model for RF amplifiers has been merged into the DAC current noise term, $i_{np}$. If necessary, this term can be expanded into terms corresponding to the RF amplifier input and to the DAC output current noise.

The output voltage ($V_o$) in the model 90 of FIG. 5 can be derived by first writing the loop equation for the loop with current $I_1$ as follows:

$$V_A = (Z_a + Z_S)I_1 + V_F + V_o + e_{nL} + e_{nS}$$

The summation of currents at the $V_L$ node may then be written as:

$$I_1 = \frac{V_o}{Z_L} + \frac{V_o + e_{nL}}{Z_p} + I_p + i_{np},$$

In addition, the current of the controller current source is $I_p = h_p V_o$ and the voltage $V_F$ is:

$$V_F = h_S Z_S V_S = h_S Z_S^2 I_1.$$

Solving for $V_O$ results in:

$$V_o = \frac{V_A}{K} - \frac{i_{np}(h_s Z_s^2 + Z_s + Z_a) + e_{nL}\left(\frac{h_s Z_s^2}{Z_p} + \frac{Z_s}{Z_p} + \frac{Z_a}{Z_p} + 1\right) + e_{ns}}{K}$$

where, $$K = 1 + \frac{h_s Z_s^2(Z_L + Z_p)}{Z_L Z_p} + h_p(Z_a + Z_s) + h_s h_p Z_s^2 + \frac{(Z_a + Z_s)(Z_p + Z_L)}{Z_p Z_L}.$$

By examination of the above equations, it is clear that since $h_p$ appears equally in the denominator of both signal and noise terms through the term K, it will not change the output SNR. Rather, the degrees of freedom are in selection of the circuit impedances and $h_s$. If $h_p$ is set to zero and $Z_p$ goes to infinity, the output voltage is:

$$V_o = \frac{V_A}{K'} - \frac{i_{np}(h_s Z_s^2 + Z_s + Z_a) + e_{nL} + e_{ns}}{K'}$$

where, $$K' = 1 + \frac{h_s Z_s^2}{Z_L} + \frac{(Z_a + Z_s)}{Z_L}.$$

The term $i_{np}$ in this equation corresponds just to the input noise current of an RF amplifier since the shunt feedback has been deleted. This noise can be affected by the choice of $h_s$. However, the SNR is maximized when $h_s$ and $Z_s$ are zero, which is equivalent to removing the series feedback entirely. This reverts back to the equivalent circuit of FIG. 2B, thus demonstrating that this circuit topology also has insufficient tuning capability in spite of its common appearance in analog-only matching to improve the SNR (e.g. analog-only non-Foster matching to improve the SNR). However, as noted earlier, maximizing SNR is just one of a number of potential benefits and the advantage of this particular topology, as discussed later, include suppression of local interference sources and as noted earlier, the equalization of the frequency response to minimize the dynamic range necessary from the receive ADC.

Figure 6:
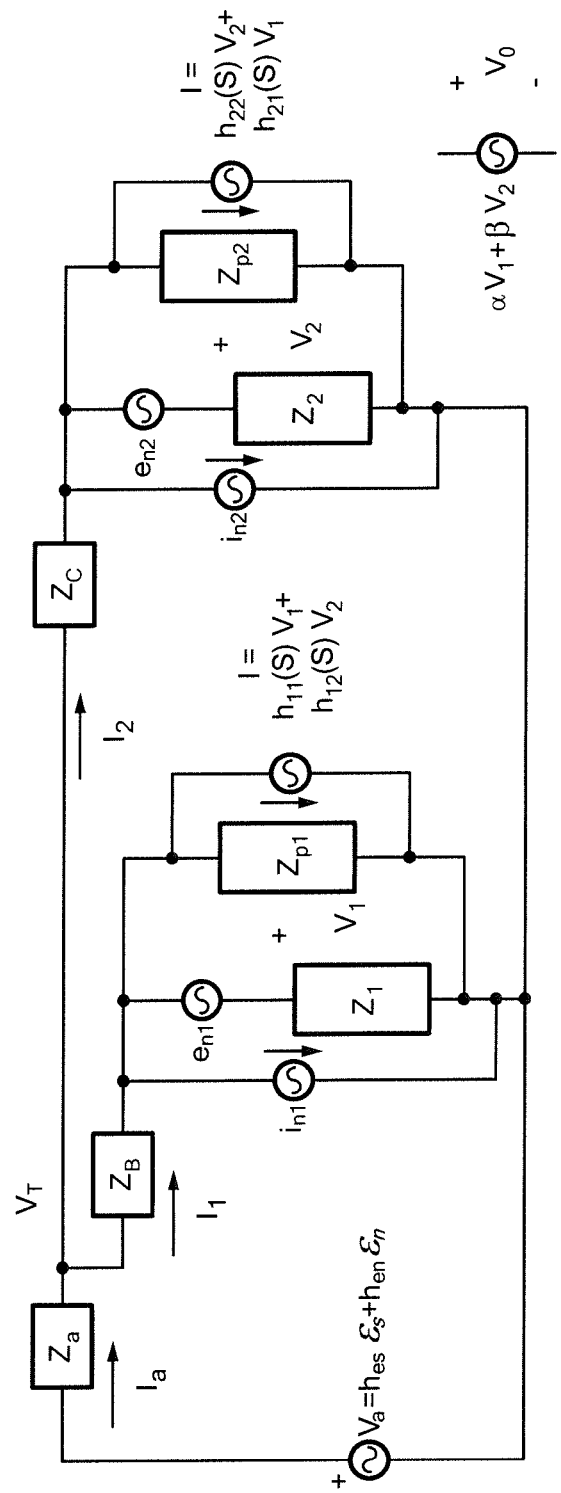
FIG. 6 is a schematic diagram illustrating an equivalent model of another antenna system in accordance with an embodiment.

FIG. 6 is a model of a more complicated antenna system topology than the one of FIG. 4. This topology has similarity to the noise canceling topologies recently proposed for radio frequency amplifiers (see, e.g., Bruccoleri et al., "Wide-Band CMOS Low-Noise Amplifier Exploiting Thermal Noise Canceling," IEEE J. Solid-State Circuits, Vol. 39, No. 2, February 2004; Zhu et al., "A DC-9.5 GHz Noise Canceling Distributed LNA in 65 nm CMOS," 2013 IEEE Radio Frequency Integrated Circuits Symposium; and Blaakmeer et al., "Wideband Balun-LNA With Simultaneous Output Balancing, Noise-Canceling and Distortion-Canceling," IEEE J. Solid-State Circuits, vol. 43, no. 6, pp. 1341-1350, June 2008). The relevant equations may be written as follows:

$$V_a - V_T = I_a Z_a$$
$$I_a = I_1 + I_2$$
$$I_1 = \frac{V_1}{Z_1} + h_{11} V_1 + h_{12} V_2 + \frac{(V_1 + e_{n1})}{Z_{p1}} + i_{n1}$$
$$I_2 = \frac{V_2}{Z_2} + h_{22} V_2 + h_{21} V_1 + \frac{(V_2 + e_{n2})}{Z_{p2}} + i_{n2}$$
$$V_T = V_1 + e_{n1} + I_1 Z_B = V_2 + e_{n2} + I_2 Z_C$$
$$V_o = \alpha V_1 + \beta V_2$$

The expressions derived for the SNR and voltage at the output of the model are non-linear functions of $h_{11}$, $h_{12}$, $h_{21}$, and $h_{22}$. The expressions for the sensed voltages are:

$$V_1 = \left(\frac{1}{K}\right)$$
$$(e_{n1}(Z_1(Z_2(Z_a(Z_{p2}(h_{12}Z_{p1} + h_{22}(Z_b + Z_c + Z_{p1}) + 1) + Z_b + Z_c + Z_{p1}) +$$
$$(Z_b + Z_{p1})(h_{22}Z_c Z_{p2} + Z_c + Z_{p2})) +$$
$$Z_{p2}(Z_a(Z_b + Z_c + Z_{p1}) + Z_c(Z_b + Z_{p1})))-$$
$$e_{n2}((Z_1 Z_{p1}(h_{12}Z_a(Z_a(Z_b + Z_c + Z_{p2}) + Z_b(Z_c + Z_{p2})) +$$
$$Z_a Z_{p2}(h_{22}Z2 + 1)))) +$$

-continued $$i_{n1}(Z_1 Z_{p1}(Z_2(Z_a(h_{22}Z_{p2}(Z_b + Z_c) + Z_b + Z_c + Z_{p2}) +$$
$$Z_b(h_{22}Z_c Z_{p2} + Z_c + Z_{p2})) + Z_{p2}(Z_a(Z_b + Z_c) + Z_b Z_c))) -$$
$$i_{n2}(Z_1 Z_2 Z_{p1} Z_{p2}(Z_a(h_{12}(Z_b + Z_c) - 1) + h_{12}Z_b Z_c)) -$$
$$V_a(Z_1 Z_{p1}(Z_2(-(h_{12}Z_b Z_{p2}) + h_{22}Z_c Z_{p2} + Z_c + Z_{p2}) + Z_c Z_{p2})))$$

and, $$V_2 = \left(\frac{1}{K}\right)(-e_{n1}(Z_2 Z_{p2}(Z_a Z_{p1}(h_{11}Z_1 + 1) +$$
$$h_{21}Z_1(Z_a(Z_b + Z_c + Z_{p1}) + Z_c(Z_b + Z_{p1})))) +$$
$$e_{n2}(Z_2(Z_1(Z_a(Z_{p1}Z_{p2}(h_{11} + h_{21}) + h_{11}Z_b Z_{p1} + h_{11}Z_c Z_{p1} + Z_b +$$
$$Z_c + Z_{p1} + Z_{p2}) + (Z_c + Z_{p2})(h_{11}Z_b Z_{p1} + Z_b + Z_{p1})) +$$
$$Z_{p1}(Z_a(Z_b + Z_c + Z_{p2}) + Z_b(Z_c + Z_{p2})))-$$
$$i_{n1}(Z_1 Z_2 Z_{p1} Z_{p2}(Z_a(h_{21}(Z_b + Z_c) - 1) + h_{21}Z_b Z_c)) +$$
$$i_{n2}(Z_2 Z_{p2}(Z_1(Z_a(h_{11}Z_{p1}(Z_b + Z_c) + Z_b + Z_c + Z_{p1}) +$$
$$Z_c(h_{11}Z_b Z_{p1} + Z_b + Z_{p1})) + Z_{p1}(Z_a(Z_b + Z_c) + Z_b Z_c))) -$$
$$V_a(Z_2 Z_{p2}(Z_1(h_{11}Z_b Z_{p1} - h_{21}Z_c Z_{p1} + Z_b + Z_{p1}) + Z_b Z_{p1})))$$

where, $$K = -Z_a(Z_1 Z_{p2}(Z_2(Z_{p1}(h_{11} + h_{12} + h_{21}) + h_{22}(h_{11}z_{p1}(Z_b + Z_c) +$$
$$Z_b + Z_c + Z_{p1}) - h_{12}h_{21}Z_{p1}(Z_b + Z_c) + 1) +$$
$$h_{11}Z_{p1}(Z_b + Z_c) + Z_b + Z_c + Z_{p1}) +$$
$$Z_1 Z_2(h_{11}Z_{p1}(Z_b + Z_c) + Z_b + Z_c + Z_{p1}) +$$
$$Z_2 Z_{p1}(h_{22}Z_{p2}(Z_b + Z_c) + Z_b + Z_c + Z_{p2}) +$$
$$Z_{p1}Z_{p2}(Z_b + Z_c)) -$$
$$Z_1(Z_2 Z_{p2}(Z_b(Z_{p1}(h_{11}h_{22}Z_c + h_{11} - h_{12}h_{21}Z_c) + h_{22}Z_c + 1) +$$
$$h_{22}Z_c Z_{p1} + Z_{p1}) +$$
$$Z_2 Z_c(h_{11}Z_b Z_{p1} + Z_b + Z_{p1}) + Z_c Z_{p2}(h_{11}Z_b Z_{p1} + Z_b + Z_{p1})) -$$
$$Z_b Z_{p1}(Z_2(h_{22}Z_c Z_{p2} + Z_c + Z_{p2}) + Z_c Z_{p2}).$$

Because it is likely that an actual implementation of the system in FIG. 6 will have large $Z_{p1}$ and $p_{p2}$ relative to $Z_1$ and $Z_2$, it is useful to see what the above equations become when $Z_{p1}$ and $Z_{p2}$ are negligible. The same equations discussed above have again been solved with $Z_{p1}=Z_{p2}=\infty$ and the solutions are given below for a more simplified view of the system operation.

$$V_1 = \left(\frac{1}{k}\right)(-e_{n1}(Z_1(Z_2(h_{12}Z_a + h_{22}(Z_a + Z_c) + 1) + Z_a + Z_c)) +$$
$$e_{n2}(Z_1(Z_a(Z_2(h_{12} + h_{22}) + 1) + h_{12}Z_2 Z_b)) -$$
$$i_{n1}(Z_1(Z_2(h_{22}Z_c(Z_a + Z_b) + h_{22}Z_a Z_b + Z_a + Z_b) + Z_a(Z_b + Z_c) +$$
$$Z_b Z_c)) + i_{n2}(Z_1 Z_2(Z_a(h_{12}(Z_b + Z_c) - 1) + h_{12}Z_b Z_c)) +$$
$$V_a(Z_1(h_{22}Z_2 Z_c - h_{12}Z_2 Z_b + Z_2 + Z_c)))$$

$$V_2 = \left(\frac{1}{k}\right)(e_{n1}(Z_2(Z_1 Z_a(h_{11} + h_{21}) + h_{21}Z_1 Z_c + Z_a)) -$$
$$e_{n2}(Z_2(Z_1(h_{11}(Z_a + Z_b) + h_{21}Z_a + 1) + Z_a + Z_b)) +$$

-continued $$i_{n1}(Z_1 Z_2(Z_a(h_{21}(Z_b + Z_c) - 1) + h_{21} Z_b Z_c)) -$$

$$i_{n2}(Z_2(Z_c(Z_1(h_{11}(Z_a + Z_b) + 1) + Z_a + Z_b) +$$

$$Z_a(h_{11} Z_1 Z_b + Z_1 + Z_b))) +$$

$$V_a(Z_2(h_{11} Z_1 Z_b - h_{21} Z_1 Z_c + Z_1 + Z_b)))$$

$$k = Z_1(Z_2(h_{11}(h_{22} Z_c(Z_a + Z_b) + h_{22} Z_a Z_b + Z_a + Z_b) -$$

$$h_{12}(h_{21} Z_c(Z_a + Z_b) + Z_a(h_{21} Z_b - 1)) + Z_a(h_{21} + h_{22}) +$$

$$h_{22} Z_c + 1) + h_{11} Z_c(Z_a + Z_b) + h_{11} Z_a Z_b + Z_a + Z_c) +$$

$$Z_2(h_{22} Z_c(Z_a + Z_b) + h_{22} Z_a Z_b + Z_a + Z_b) + Z_c(Z_a + Z_b) + Z_a Z_b$$

From the simplified equations above, sufficient freedom exists in the values of the transfer functions $h_{11}$, $h_{12}$, $h_{21}$, and $h_{22}$ to optimize the overall response to achieve specific performance. In that optimization, the filter coefficients, coupling impedances, and load impedances are free functions.

To illustrate the optimization surface, point solutions have been tried. One example is the following solution that is intended to limit voltage noise. The following multiplier of the direct $e_{n1}$ term was set to 0.5:

$$Z_1(Z_2(h_{12} Z_a + h_{22}(Z_a + Z_c)+1) + Z_a + Z_c) = 0.5,$$

and the cross-coupled noise voltage $e_{n2}$ was set to zero:

$$Z_1(Z_a(Z_2(h_{12}+h_{22})+1)+h_{12} Z_2 Z_b) = 0.0.$$

The resulting filters and output voltage were then solved for with $Z_1 = Z_2 = Z$ (for simplification). The resulting filters are:

$$h_{12} = \frac{(2 Z_a Z^2 - Z_a)}{((2Z_b + 2Z_a)Z_c + 2Z_a Z_b)Z^2},$$

and, $$h_{22} = \frac{2(Z_b + Z_a)Z^2 + (2(Z_b + Z_a)Z_c + 2Z_a Z_b)Z - Z_b - Z_a}{((2Z_b + 2Z_a)Z_c + 2Z_a Z_b)Z^2},$$

With the result that:

$$V_1 = \left(\frac{1}{K''}\right)(-e_{n1} - i_{n1}(Z_a + Z_b) - i_{n2} Z_a + V_a)$$

and, $$K'' = \frac{(h_{11} Z_b + Z_a(h_{11} + h_{21}) + 1)Z + Z_b + Z_a}{4Z} = \frac{Z + Z_b + Z_a}{4Z}\bigg|_{h_{11}, h_{21}=0}$$

The noise figure impact of the voltage division inherent in antenna matching has been overcome and the SNR contained in the electric field sensed by the antenna has been preserved. There is no indication of a significant increase in noise due to LNA-related noise sources as was apparent in the first single-loop example.

Figure 7A:
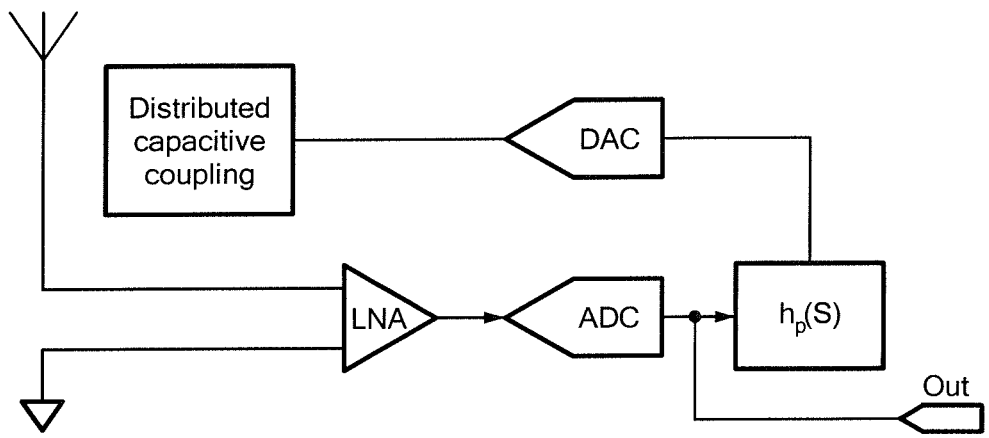
FIGS. 7A and 7B are block diagrams illustrating two multi-port matched antenna system topologies in accordance with embodiments.
Figure 7B:
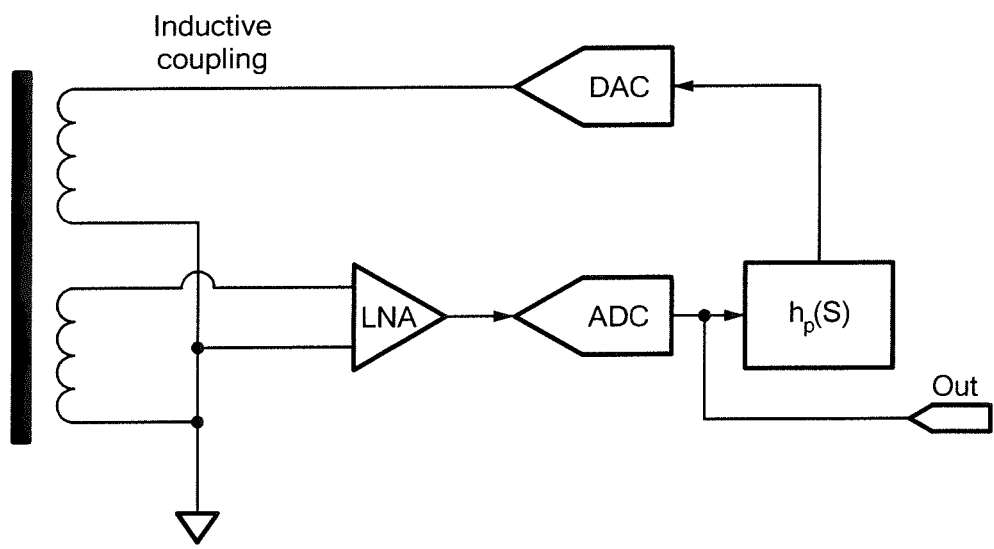

Up to this point, the antenna has been treated as a simple one-port device. Chu's limit on bandwidth-efficiency assumes a single port device. In some embodiments, the above-described techniques are extended to multi-port antennas and, in particular, multi-port antennas with active feedback. FIGS. 7A and 7B are block diagrams illustrating two multi-port antenna topologies that may be used in accordance with embodiments. In implementing these topologies, the impact of the feedback on nearby electric or magnetic fields, if any, will have to be considered as this is likely to change the impedance that the antenna presents to free space propagation. In analog electronic circuits, these topologies would typically be referred to as bootstrap circuitry with feedback gain of slightly less than one. In this case, the feedback can be shaped as a function of frequency and these circuits are much more general than the typical bootstrap approaches. This multi-port antenna approach can allow the feedback loop to be completed through the antenna structure by summing electric field or magnetic flux rather than voltage or current at the input of the LNA. In some embodiments, this can improve overall system performance by allowing the multi-port antenna to be dual purpose as both the antenna element and feedback-summing network. Additionally, with multiple driven feedback ports, multi-loop feedback can be implemented in a hybrid analog/digital fashion.

FIG. 7B illustrates an arrangement where an antenna structure includes two windings on a ferrite rod (which is a typical electrically small antenna used at HF). Each winding forms a port of the antenna. The two windings share magnetic flux in a manner that forms a summing junction for the feedback. Additional windings may be added to form further feedback loops. Similarly, FIG. 7A illustrates the dual of the arrangement in FIG. 7B. That is, FIG. 7A shows a distributed capacitive coupling topology that has the effect of summing electric fields rather than magnetic flux.

It the discussion above, various structures and concepts have been presented in the context of single-ended circuits and antenna elements. It should be appreciated that these structures and concepts may also be implemented as balanced circuits with amplifiers on each arm and cross coupling between them. Further, it should be appreciated that, in some embodiments, a ferrite loop antenna may incorporate one or more inductance reduction approaches such as those that are currently used in Low-Frequency (LF) receive antennas (see, e.g., Spears et al., "Loop Antenna Comprising Plural Helical Coils on Closed Magnetic Core," U.S. Pat. No. 3,495,264; and Sontheimer et al., "Reception of Signals on a Loop Antenna," U.S. Pat. No. 2,375,593).

The ADCs and DACs in the systems described above are sampled components that have inherent bandwidth limitations. Associated with this sampling is an inherent delay both in these interface chips and in the digital filters that are used to shape the response. It is expected that the operating band can be extended beyond the limits of current ADC, DAC, and digital filter technology using the following techniques. The ADC and DAC can be operated in a sub-sampling mode. The resulting matching could then occur in Nyquist zones beyond the first zone. Operating in sub-sampling mode could be enhanced by the sub-sampling ADCs and DACs operating with direct I/Q sampling where multiple devices are operated in quadrature relative to the operating frequency. Downconversion of the RF signals before sampling by the ADC and upconversion after being output by the DAC will also potentially allow extending the operating band. However, the band limiting filters inherent in today's implementation of this mixer approach are likely to limit the benefit.

Sampling and digital filter delays add a phase shift that becomes progressively worse as the operating frequency increases. The phase shift can impair stability and prevent an improved match. One method of mitigating this phase shift is to modify the feedback filters. In digital signal processing terms, one modification may be to use a prediction filter in the feedback. Signals received by most antennas are quite structured. The spectral distribution of energy imparts temporal correlation that can be exploited in the filter.

In some implementations, matched antennas are provided that are capable of adapting to changing conditions in an environment about the antenna. To be responsive, some mechanism is needed to allow the system state to be observed so that the digital filters can be controllably adapted. To facilitate observation, in some implementations, a known probing waveform may be introduced into the digital matching circuitry. The probing (or excitation) waveform may be added into, for example, the summing circuitry of one or more circuit blocks. The response of the antenna and matching circuits to the known waveforms may then be sensed. A master control block is provided in some embodiments that observes the known excitation waveform signals sensed by the circuit blocks (e.g. sensed by the non-Foster circuit blocks), infers the circuit and antenna model from those observations, and adjusts the coefficients of the digital filters to achieve a desired result. The desired result may include, for example, maximum power transfer, maximum signal-to-noise ratio, suppression of undesired receive signals, suppression of undesired non-linear circuit responses, and/or others. The known excitation waveform may be either an independently generated signal or a low-level modulation of a signal observed by any particular circuit block. The circuit response identified using the excitation waveform may include a linear response, a non-linear response, or a combination of both linear and nonlinear terms.

Figure 8:
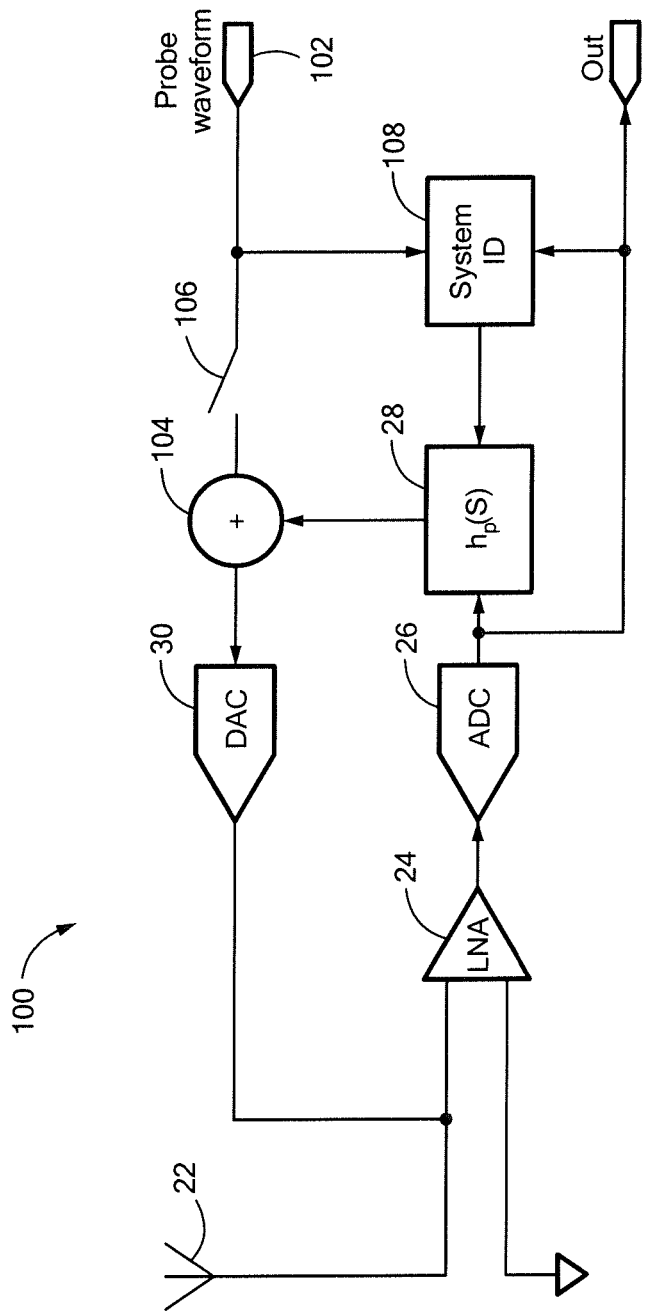
FIG. 8 is a block diagram illustrating an exemplary adaptive matched antenna system in accordance with an embodiment.

FIG. 8 is a block diagram illustrating an exemplary adaptive matched antenna system 100 that uses a probing waveform in accordance with an embodiment. As illustrated, the antenna system 100 is similar to the antenna system 20 of FIG. 2A. However, a probe waveform port 102 (or a probe waveform generator) has been added to receive (or generate) a probe waveform that may be used to observe a current state of the match. The probe waveform port 102 is coupled to an input of a summation device 104 that allows the probe waveform to be superimposed on the output signal of the digital filter 28. As will be described in greater detail, the superimposed probe waveform will be converted to an analog format in the DAC 30 and thereafter be applied to the input of the LNA 24. A corresponding response of the LNA 24 and antenna 22 to the probe waveform may be used as an indication of the current antenna match. A switch 106 is shown in FIG. 8 to indicate that the probe waveform generator may be controllably activated and deactivated within the system 100 in some implementations. In this example, a system ID block 108 is provided to adaptively determine the optimal feedback transfer function 28. The system ID block 28 would monitor the measured signal through ADC 26 and compare it to the probe waveform to determine how the antenna element and digital feedback (e.g. digital non-Foster feedback) altered the probe waveform. In this manner the system is effectively measuring the antenna and receiver impedance and calculating the optimal feedback transfer function 28, thus implementing an adaptive equalizer. Different optimization rules can be implemented depending on the role of the system.

In different implementations, the probing waveform may take a different forms. In one approach, for example, a relatively high level signal that covers the entire band of interest may be periodically inserted as the probing waveform. The circuit and antenna response may then be observed and a system model created that can be used to modify the filter(s). This approach has the advantage that the signal can be large to provide high dynamic range in a small period of time. However, a drawback is that there could be some radiation from the antenna as a result of a moderately high level probing signal. Since the probe waveform is high level, it will also appear in the receiver output and that section of data might be unusable.

In an alternative approach, a probe waveform may be used that is active continuously. Such a waveform can be of a much lower level. Since the waveform is known, the observation can be over a long time period to increase the probe SNR. If the signal is small enough, it can be ignored at the output. If larger, then the response of the circuit to the probe waveform is already being estimated in the System ID block and can be removed as in the following paragraph.

Figure 9:
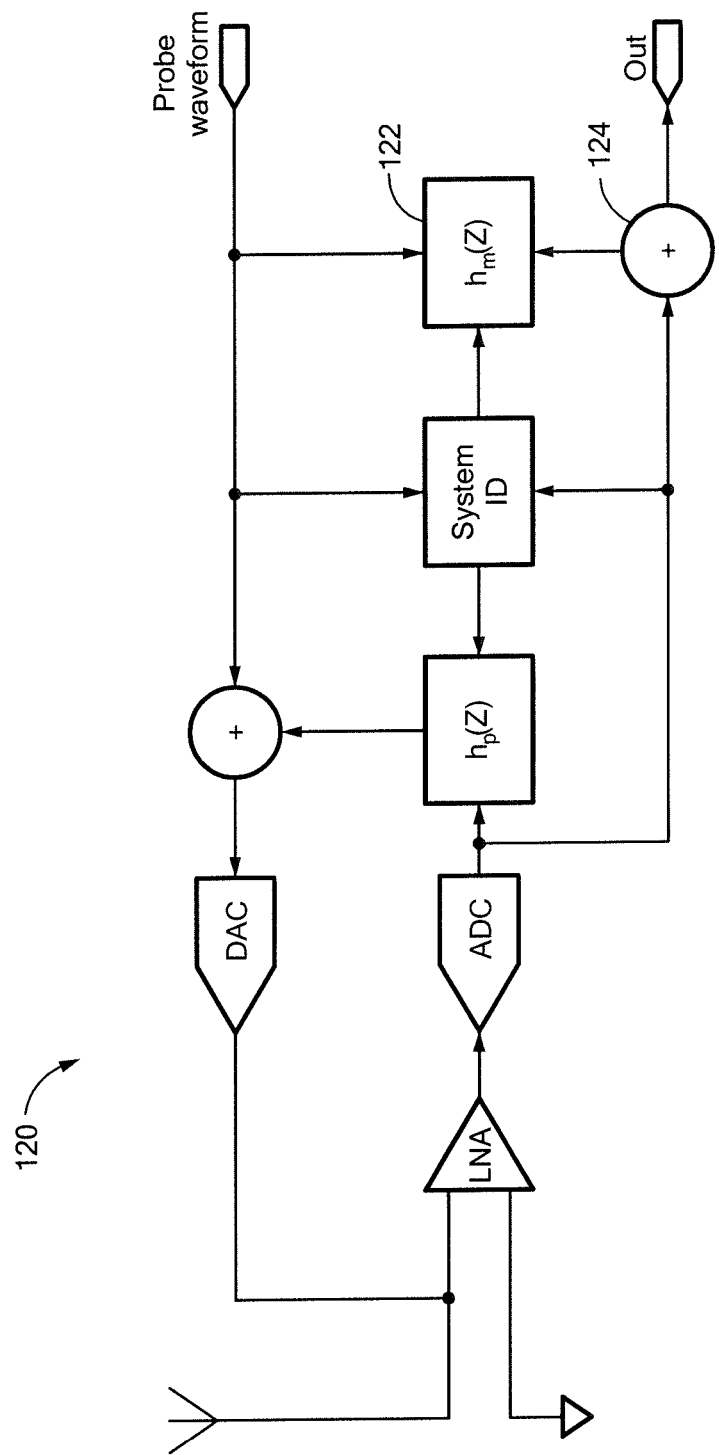
FIG. 9 is a block diagram illustrating another exemplary adaptive matched antenna system in accordance with an embodiment.

FIG. 9 is a block diagram illustrating another exemplary adaptive matched antenna system 120 that uses a probing waveform in accordance with an embodiment. In the system 10 of FIG. 8, the circuit response to the probing waveform was used to determine the matching filter. In the system 120 of FIG. 9, on the other hand, a compensation filter 122 is calculated and applied to the probe waveform. The result is then subtracted from the output data stream in a summation device 124.

Figure 10:
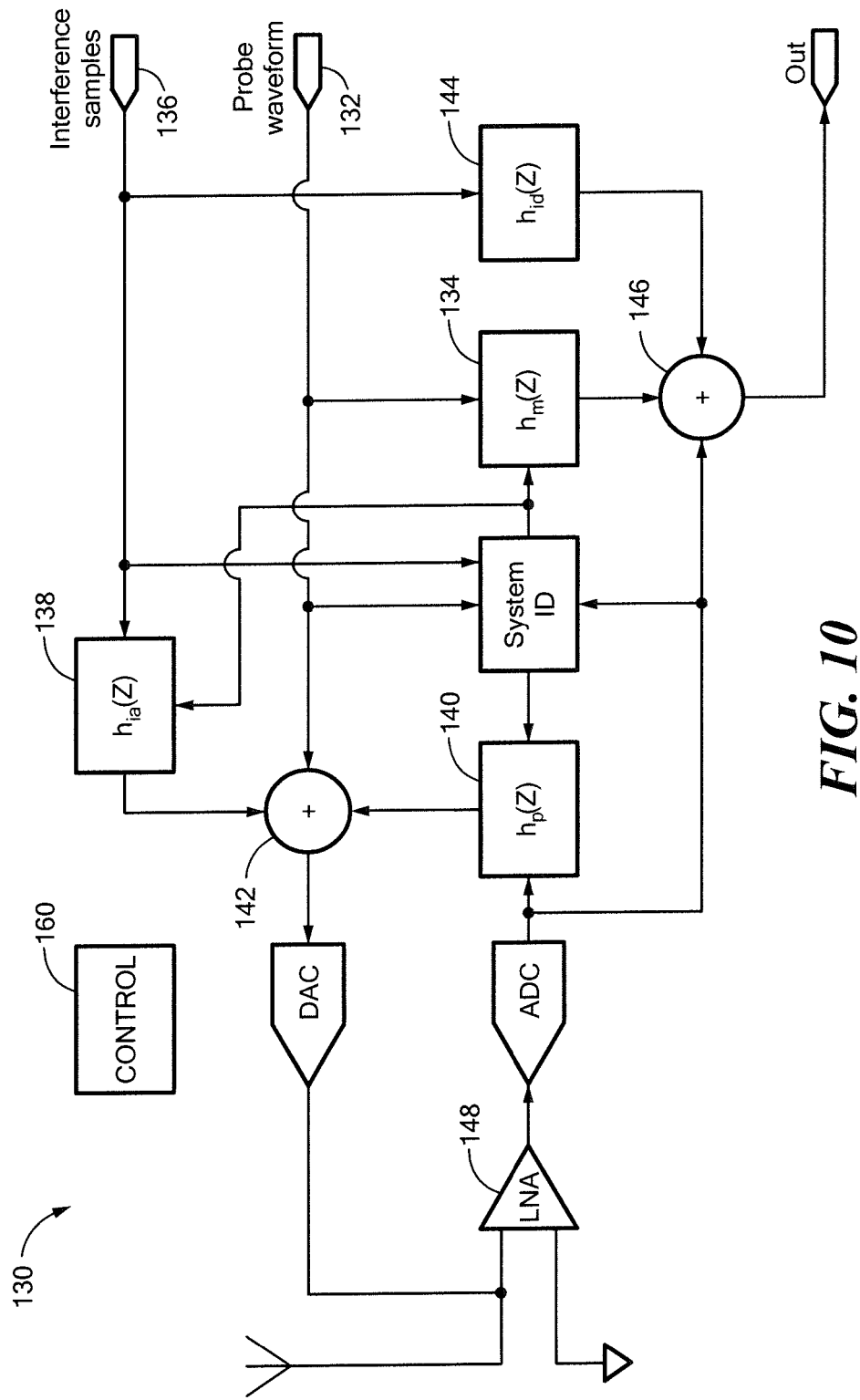
FIG. 10 is a block diagram illustrating an exemplary adaptive matched antenna system that is capable of implementing STAR operation in accordance with an embodiment.

FIG. 10 is a block diagram illustrating an exemplary adaptive matched antenna system 130 that is capable of STAR operation in accordance with an embodiment. As shown, the system 130 includes a probe waveform input 132 and a compensation filer 134 that are similar to those shown in FIG. 9. In addition, the antenna system 130 includes an input 136 to receive interference samples. A digital filter 138 may be provided to process the interference samples before they are superimposed on the output signal of matching filter 140 by summation device 142. Another digital filter 144 may also be provided to process the interference samples for purposes of subtracting the effect of the interference samples from the output signal of the system 130 (in summation unit 146). As shown in FIG. 10, a master control block 160 may be provided to observe the known excitation waveform signals sensed by the circuit blocks (e.g. non-Foster circuit blocks), infer the circuit and antenna model from those observations, and adjust the coefficients of the digital filters to achieve a desired result. The desired result can include, for example, maximum power transfer, maximum SNR, suppression of undesired received signals, suppression of undesired non-linear circuit responses, and or others.

The interference samples may be representative of data signals that are transmitted from a nearby (e.g., collocated, etc.) RF transmitter. Because the interference is self-generated, a digital copy of the transmitted signals may be available for use. The interference samples are digitally filtered in the filter 138, where the response is shaped to ensure that the interfering signals are subtracted from the analog signal being received, before the signal is amplified in the LNA 148. A second level of suppression of the locally generated interference may be provided digitally through the filter 144. The design of filters to null interference from digital data streams is well known (see, e.g. *Adaptive Filter Theory*, Simon Haykin, Prentice Hall 1986) and, therefore, will not be discussed further. Because the system 130 is capable of suppressing locally generated signals, it has application in STAR-based systems.

Figure 11:
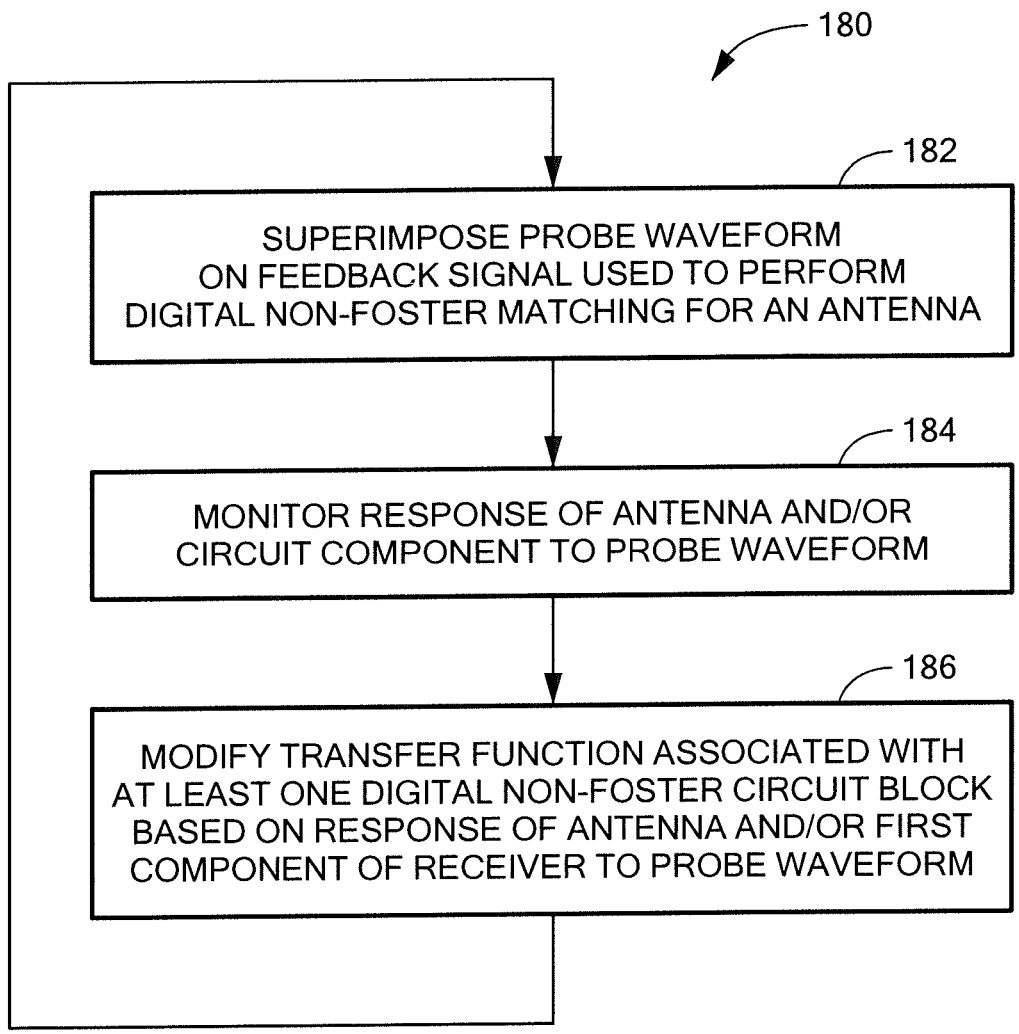
FIG. 11 is a flow chart illustrating an exemplary method for adapting an antenna match based on a changing antenna environment in accordance with an embodiment.

FIG. 11 is a flow diagram illustrating an exemplary process 180 for adapting an antenna match based on a changing antenna environment in accordance with an embodiment. The process may be used with electrically small antennas as well as other antennas.

The rectangular elements (typified by element 182 in FIG. 11) are herein denoted "processing blocks" and may represent computer software instructions or groups of instructions. It should be noted that the flow diagram of FIG. 11 represents one exemplary embodiment of a design described herein and variations in such a diagram, which generally follow the process outlined, are considered to be within the scope of the concepts, systems, and techniques described and claimed herein.

Alternatively, the processing blocks may represent operations performed by functionally equivalent circuits such as a digital signal processor (DSP) circuit, an application specific integrated circuit (ASIC), or a field programmable gate array (FPGA). The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the actions described below are unordered meaning that, when possible, the sequence shown in FIG. 1 can be performed in any convenient or desirable order.

The adaptation process 180 of FIG. 11 is implemented in an antenna system that uses digital non-Foster matching to achieve an antenna match. As such, the antenna system includes at least one digital non-Foster block to provide feedback to a node associated with an antenna. The antenna system may be operating within a changing environment that can impact the matching between an antenna and another circuit component in the system (e.g., an LNA, etc.). To determine whether changes have occurred in the match (i.e., whether the match has degraded), a known probe waveform is superimposed on a feedback signal in the system to determine a state of the match (block 182). A response of the antenna and/or circuit component to the probe waveform is monitored (block 184). A transfer function associated with at least one digital non-Foster circuit block of the antenna system may then be modified based on the response of the antenna and/or circuit component to the probe waveform (block 186). The modification of the transfer function(s) may be performed to maintain a desired matching result over time, such as, for example, achieving maximum (or near maximum) power transfer, achieving maximum (or near maximum) SNR, suppressing undesired receive signals, suppressing undesired non-linear circuit responses, etc. The process may be performed repeatedly or continuously in the system to maintain the desired match in changing environmental conditions.

Although described above in the context of HF systems, it should be appreciated that many of the concepts, features, and benefits described herein are applicable in a wide variety of different frequency ranges and are not limited to any particular frequency range or ranges. In addition, although described above in the context of providing a match for an electrically small antenna, it should be appreciated that techniques and structures described herein also have application with antennas that are not electrically small. Furthermore, although described above predominantly in the context of receiver systems, it should be appreciated that the various techniques and structures of the present disclosure may also be used to match transmit antennas or combination transmit/receive antennas.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An antenna system, comprising:
an antenna;
receiver circuitry to process signals received by the antenna, the receiver circuitry including a first electronic component having an input coupled to a port of the antenna; and
matching circuitry to tune a transfer function between the antenna and the first electronic component, the matching circuitry including a digital circuit block to implement matching, the digital circuit block being coupled to provide feedback to the port of the antenna, wherein the digital circuit block includes:
an analog-to-digital converter (ADC) to convert a sensed analog input signal to a digital output signal;
a digital processor to process the digital output signal of the ADC in accordance with a transfer function associated with a matching scheme; and
a digital-to-analog converter (DAC) to convert a digital output signal of the digital processor to an analog signal.

2. The antenna system of claim 1, wherein:
the ADC of the digital circuit block samples a signal on a node of the receiver circuitry after the first electronic component; and
the DAC of the digital circuit block injects an analog signal at the input of the first electronic component.

3. The antenna system of claim 1, wherein:
the matching circuitry includes multiple digital circuit blocks, wherein each of the multiple digital circuit blocks implements a different transfer function within a corresponding digital processor and provides feedback to the antenna port by a different mechanism.

4. The antenna system of claim 1, wherein:
the matching circuitry includes at least two digital circuit blocks that are cross coupled with one another in a manner that combines different sensing modes with different feedback mechanisms.

5. The antenna system of claim 1, wherein:
the matching circuitry is configured to adapt to a changing environment around the antenna to tune the transfer function between the antenna and the first electronic component.

6. The antenna system of claim 5, wherein the matching circuitry further comprises:
a waveform source for imparting a probe waveform to a node associated with the first electronic component and the antenna; and a monitor for monitoring a response of the first electronic component and/or the antenna to the probe waveform.

7. The antenna system of claim 6, wherein the matching circuitry further comprises:
a system model generator to generate a system model based on the response of the first electronic component and/or the antenna to the probe waveform; and
a filter modification unit to modify the transfer function associated with the digital non-Foster circuit block based, at least in part, on the system model.

8. The antenna system of claim 7, wherein the system model is a linear model.

9. The antenna system of claim 7, wherein the system model includes both linear and non-linear responses.

10. The antenna system of claim 7, wherein the transfer function is used to maximize signal to noise ratio at an antenna system output port.

11. The antenna system of claim 7, wherein the transfer function is used to minimize signal distortion at an antenna system output port.

12. The antenna system of claim 6, wherein the matching circuitry further comprises:
a system model generator to generate a system model based on the response of the antenna and/or first electronic component to the probe waveform;
a compensation filter of the probe waveform to generate an output signal representative of a response of the antenna and first electronic component to the probe waveform; and
a difference unit to subtract the signal representative of the probe waveform response from an output signal of the first electronic component.

13. The antenna system of claim 6, further comprising means to activate and deactivate the waveform source.

14. The antenna system of claim 6, wherein:
the waveform source is configured to generate a probe waveform having a bandwidth that encompasses an operational bandwidth of the antenna system.

15. The antenna system of claim 6, wherein:
the waveform source is configured to generate a probe waveform having a relatively high signal level and a short duration.

16. The antenna system of claim 6, wherein:
the waveform source is configured to generate a probe waveform having a relatively low signal level that is continuously applied to the node during antenna operation.

17. The antenna system of claim 1, wherein:
the ADC and the DAC are configured to operate in a sub-sampling mode and the matching circuitry is configured to perform matching operations in Nyquist zones greater than a first Nyquist zone.

18. The antenna system of claim 1, wherein:
the digital processor is programmed with instructions to process the digital output signal of the ADC in accordance with a transfer function associated with a matching scheme.

19. The antenna system of claim 18, wherein the instructions to process the digital output in accordance with a transfer function that include at least one of a maximum power transfer (non-Foster), maximum signal-to-noise ratio, maximum dynamic range, and/or other matching schemes and transfer functions that can be adaptively, controllably programmed with precise tolerances beyond those inherent with an analog-based matching scheme.

20. The antenna system of claim 1, wherein:
the matching circuitry includes multiple digital non-Foster circuit blocks, wherein each of the multiple digital non-Foster circuit blocks implements a different transfer function within a corresponding digital processor and provides feedback to the antenna port by a different mechanism.

21. The antenna system of claim 1, wherein:
the matching circuitry includes at least two digital non-Foster circuit blocks that are cross coupled with one another in a manner that combines different sensing modes with different feedback mechanisms.

22. The antenna system of claim 21, wherein the matching circuitry further comprises:
a system model generator to generate a system model based on the response of the first electronic component and/or the antenna to the probe waveform; and
a filter modification unit to modify the transfer function associated with the digital non-Foster circuit block based, at least in part, on the system model.

23. The antenna system of claim 22, wherein the system model includes one or more of:
a linear model;
both linear and non-linear responses.

24. The antenna system of claim 22, wherein the transfer function operates to perform at least one of: increasing signal to noise ratio at an antenna system output port; and reducing signal distortion at an antenna system output port.

25. A method for tuning a transfer function between an antenna and an electronic component, the method comprising:
sampling and digitizing a signal at a circuit node in an antenna system having an antenna coupled to a first electronic component;
filtering the digitized signal in a digital filter to generate a filtered digital signal;
converting the filtered digital signal to an analog signal and feeding the analog signal back to a node associated with the antenna, wherein the digital filter includes a transfer function that is designed to provide non-Foster matching between the antenna and the first electronic component;
superimposing a probe waveform onto the analog signal that is fed back to the node associated with the antenna;
monitoring a response of the antenna and/or the first electronic component to the probe waveform; and
modifying the transfer function of the digital filter based on the response of the antenna and/or the first electronic component to the probe waveform to maintain a desired condition between the antenna and the first electronic component when an environment about the antenna is changing.

26. The method of claim 25, further comprising:
continually repeating superimposing, monitoring, and modifying during operation of the antenna system.

27. The method of claim 25, wherein:
superimposing includes adding a digital version of the probe waveform to the filtered digital signal before converting the filtered digital signal to an analog signal.

28. The method of claim 25, wherein:
the transfer function of the digital filter is computed in accordance with one of the following goals: optimizing power transfer, optimizing SNR, suppressing undesired receive signals, and suppressing undesired non-linear circuit responses.

29. The method of claim 25, wherein:
the digital filter includes a first digital filter and the filtered digital signal includes a first filtered digital signal; and
the method further comprises:
- filtering the digitized signal in a second digital filter to generate a second filtered digital signal; and
- converting the second filtered digital signal to a second analog signal and feeding the second analog signal back to a node associated with the antenna, wherein the second digital filter includes a second transfer function that is designed to provide non-Foster matching between the antenna and the first electronic component.

30. The method of claim 25, wherein:
the circuit node in the antenna system includes a first circuit node; and
the method further comprises:
- sampling and digitizing a second signal at a second circuit node in the antenna system to generate a second digitized signal;
- filtering the second digitized signal in a second digital filter to generate a second filtered digital signal; and
- converting the second filtered digital signal to a second analog signal and feeding the second analog signal back to the same or a different node associated with the antenna, wherein the second digital filter includes a second transfer function that is designed to provide non-Foster transfer function tuning between the antenna and the first electronic component.

31. An antenna system, comprising:
a multiport antenna;
receiver circuitry to process signals received by the multiport antenna, the receiver circuitry including a first electronic component having an input coupled to one or more ports of the antenna; and
matching circuitry to tune a transfer function between the multiport antenna and the first electronic component, the matching circuitry including a digital non-Foster circuit block to implement non-Foster matching, the digital non-Foster circuit block being coupled to provide feedback to at least one port of the multiport antenna so that the antenna forms a portion of the feedback loop, wherein the digital non-Foster circuit block includes:
- an analog-to-digital converter (ADC) to convert a sensed analog input signal to a digital output signal;
- a digital processor to process the digital output signal of the ADC in accordance with a transfer function associated with a non-Foster matching scheme; and
- a digital-to-analog converter (DAC) to convert a digital output signal of the digital processor to an analog signal.

32. The antenna system of claim 31, wherein:
the matching circuitry includes one DAC for each of at least two ports of the antenna for use in providing feedback.

33. The antenna system of claim 31, wherein:
the multiport antenna includes multiple coils wrapped about a common magnetic core, wherein each coil defines a port of the antenna and the magnetic core forms a feedback summing junction wherein the multiple coils are configured to achieve a desired flux combining ratio.

34. The antenna system of claim 31, wherein:
the multiport antenna includes distributed capacitive coupling structures to serve as a feedback summing junction, wherein one or more feedback signals are coupled through an electric field within the distributed capacitive coupling.

* * * * *

UNITED STATES PATENT AND TRADEMARK OFFICE
CERTIFICATE OF CORRECTION

PATENT NO. : 9,825,659 B2  
APPLICATION NO. : 14/916376  
DATED : November 21, 2017  
INVENTOR(S) : Frank C. Robey et al.

Page 1 of 1

It is certified that error appears in the above-identified patent and that said Letters Patent is hereby corrected as shown below:

In the Specification

Column 1, Line 32, delete "long felt" and replace with --long-felt--.

Column 5, Line 36, delete "Non-Foster" and replace with --non-Foster--.

Column 5, Line 37, delete "Non-Foster" and replace with --non-Foster--.

Column 5, Line 38, delete "Non-Foster" and replace with --non-Foster--.

Column 5, Line 41, delete "Non-Foster" and replace with --non-Foster--.

Column 7, Line 31, delete "[0060]".

Column 8, Line 44, delete "$V = \frac{I}{N^2}\left(\frac{Z}{1+h(s)Z}\right).$" and replace with --$V = \frac{I}{N^2}\left(\frac{Z}{1+h(s)Z}\right)$--.

Column 11, Line 30, delete "Ohms" and replace with --ohms--.

Column 14, Line 47, delete "$p_{p2}$" and replace with --$Z_{p2}$--.

Column 16, Line 33, delete "It" and replace with --In--.

Column 18, Line 31, delete "filer" and replace with --filter--.

Signed and Sealed this  
Sixteenth Day of April, 2019

Andrei Iancu  
*Director of the United States Patent and Trademark Office*